July 12, 1955 P. C. ARNOLD 2,713,106
WELDING APPARATUS
Filed Dec. 5, 1949 3 Sheets-Sheet 1
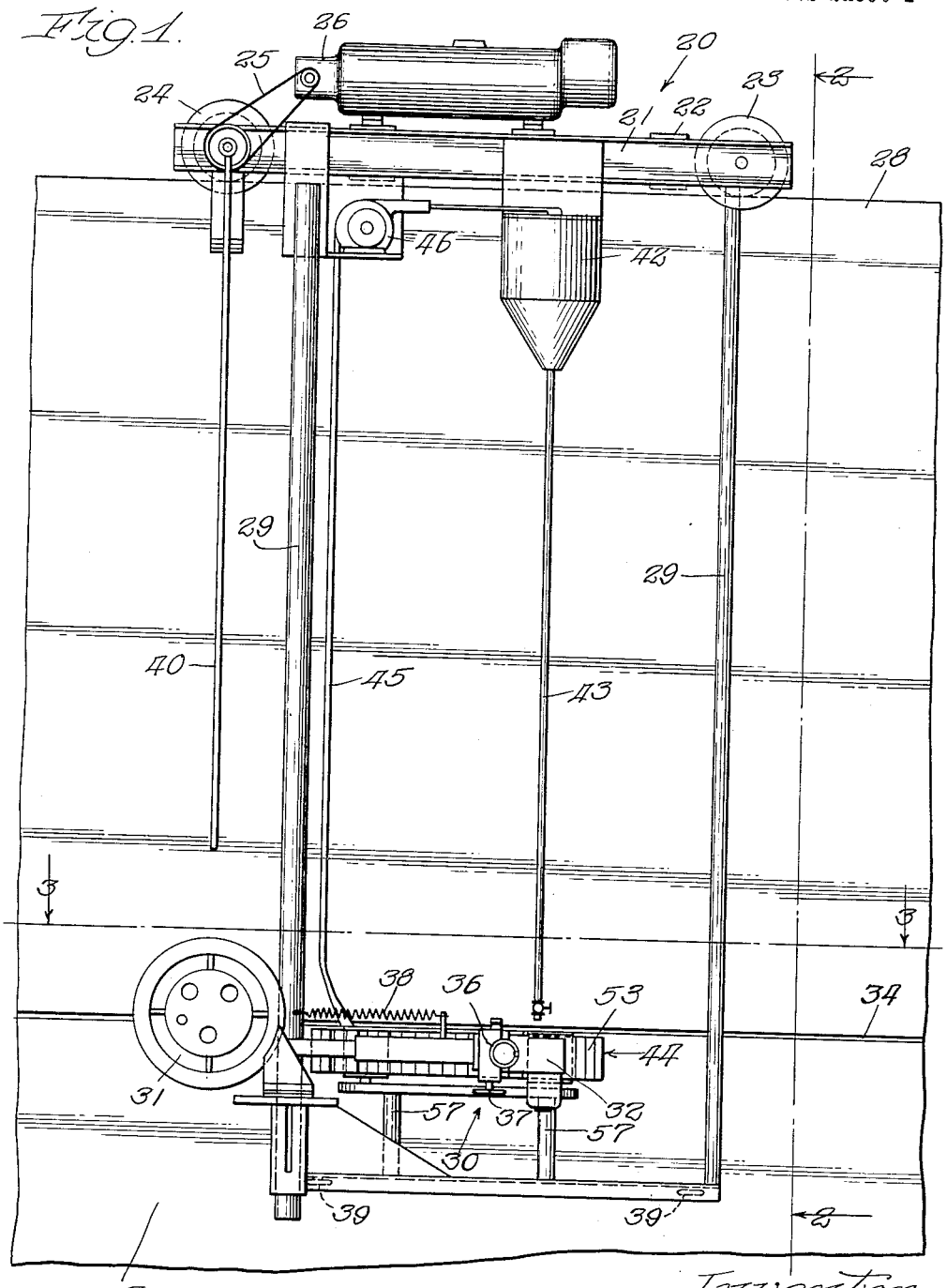
Inventor:
Perry C. Arnold,
By Schroeder, Merriam,
Hofgren & Brady, Attys.

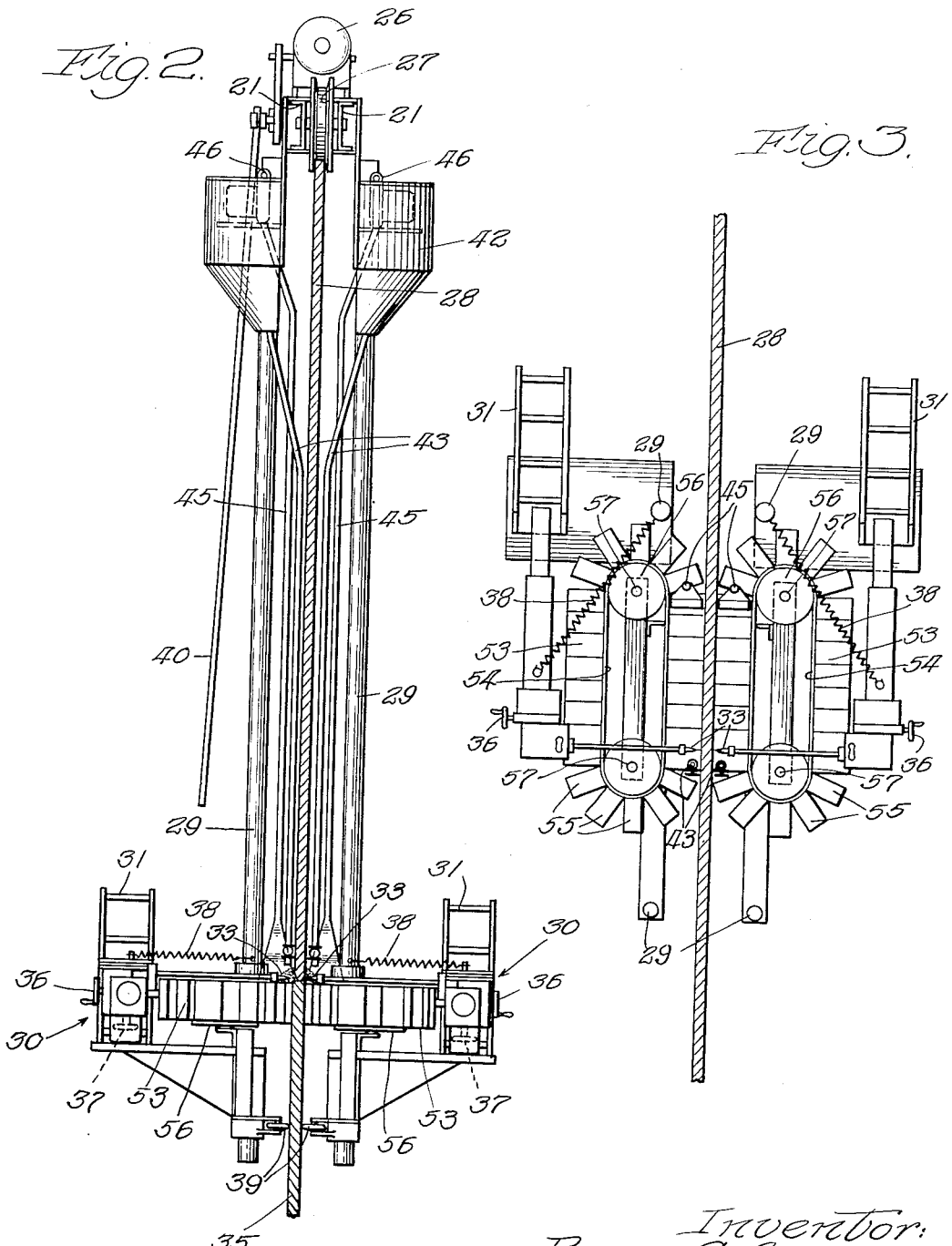

July 12, 1955     P. C. ARNOLD     2,713,106
WELDING APPARATUS
Filed Dec. 5, 1949     3 Sheets-Sheet 3
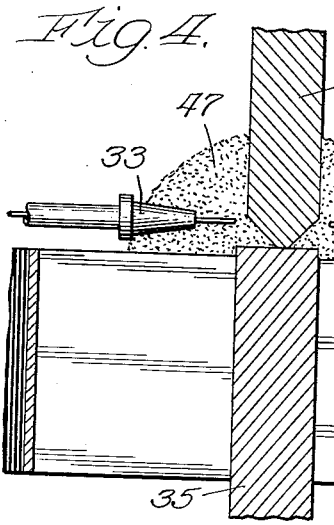
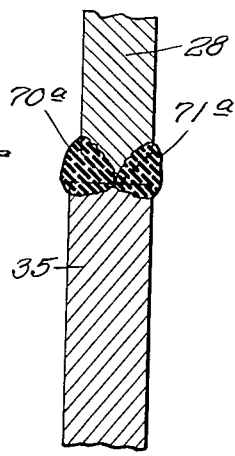
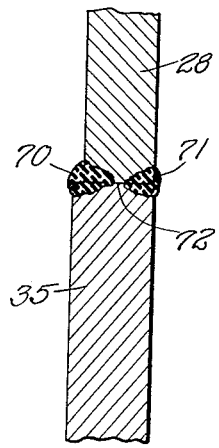
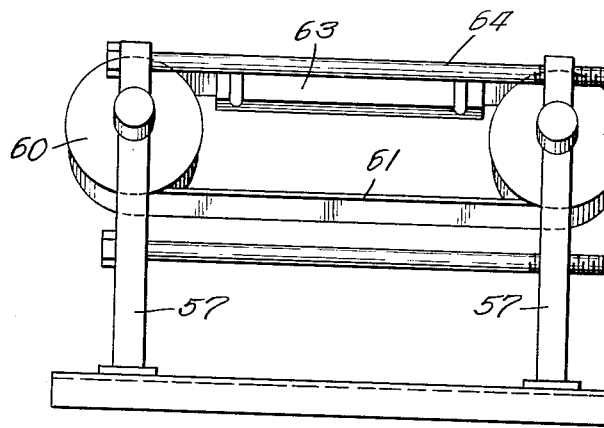
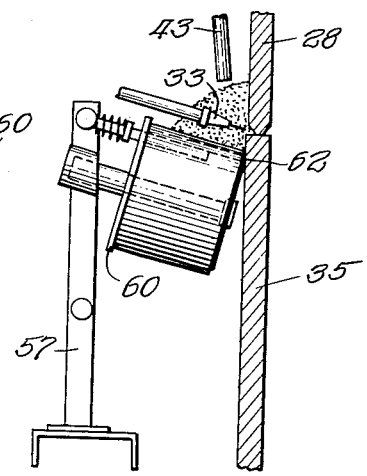
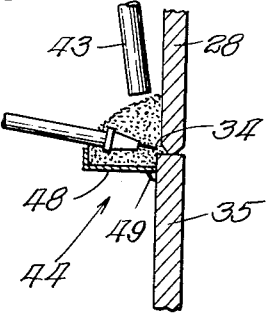
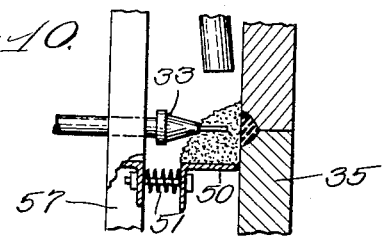
Inventor:
Perry C. Arnold,
By Schroeder, Merriam,
Hofgren & Brady, Attys.

United States Patent Office 2,713,106
Patented July 12, 1955

2,713,106

WELDING APPARATUS

Perry C. Arnold, Chicago, Ill., assignor to Chicago Bridge & Iron Company, a corporation of Illinois Application December 5, 1949, Serial No. 131,223

10 Claims. (Cl. 219—8)

This invention relates to welding, and more particularly to apparatus for continuously welding a long seam.

Hand welding of long seams is a particularly tedious, time-consuming and, hence, expensive operation. Long horizontal seams are found in many types of construction and very often in the construction of welded liquid storage tanks. In such tanks, which may have a diameter of 200 feet or more, a number of plates are welded in edge-to-edge relationship along circular horizontal seams. Where there are several of such seams to be welded on both sides, the total length of seam welding is considerable.

I have invented and am herein disclosing and claiming, apparatus for continuously welding long seams. The apparatus of this invention is particularly adapted for use in welding horizontal seams between plate forming part of a circular structure such as a liquid storage tank. The invention involves the use of automatic metal arc welding and is particularly adaptable for use with the submerged arc welding process.

According to this invention, I provide a self-powered carriage adapted to roll along the upper edge of a vertical plate and to carry a welding apparatus along the seam between that plate and the next adjoining lower plate. I provide the carriage with the necessary apparatus to permit the entire circumference of the tank along a single seam to be welded in a single pass. In addition, both sides of the seam may be welded simultaneously, if desired.

The invention will be described in conjunction with the accompanying drawings, of which:

Fig. 1 is a side elevation of the apparatus of this invention in position on a portion of the side walls of a liquid storage tank;

Fig. 2 is a vertical section along line 2—2 of Fig. 1;

Fig. 3 is a horizontal section along line 3—3 of Fig. 1;

Fig. 4 is an enlarged detailed view of the flux carrying shoe and welding heads for simultaneously welding opposite sides;

Figs. 5 and 6 are sectional views through welded seams;

Fig. 7 is a side elevation of a modified form of the device;

Fig. 8 is an end view of the device of Fig. 7;

Fig. 9 is a view like Fig. 4, showing a modified form of flux carrier used in welding one side of a seam; and Fig. 10 is a view like Fig. 9 of another form of the device.

While my invention is susceptible of embodiment in many different forms, I have shown in the drawings and will herein describe in detail several such embodiments with the understanding that the present disclosure is to be considered as an exemplification of the principles of the invention and is not intended to limit the invention to the embodiments illustrated. The scope of the invention will be pointed out in the appended claims.

Referring now to the drawings, I show a carriage 20 comprising a pair of channel irons 21 held in spaced relationship by spacer blocks 22 and provided at its front end with a wheel 23 rotatably mounted between the frame members 21 and at its rear end with a second wheel 24 similarly mounted. Wheel 24 is adapted to be driven by means of a chain 25 connected to a variable speed motor 26. The wheels 23 and 24 are each formed with a deep groove 27 adapted to receive the upper edge of a plate 28 and to carry the carriage therealong.

A framework 29 is suspended vertically from the carriage and is provided at its lower end with a welding apparatus 30. In the particular embodiment in Figs. 1 to 4, inclusive, two such frames 29 and apparatus 30 are provided. As the frames and welding apparatus on both sides of the plate are similar in all respects, only one will be described in detail. Accordingly, the welding apparatus 30 comprises a drum 31 adapted to hold a coil of electrode wire and motor means 32 adapted to feed the electrode from the coil to a welding head 33 directed against the seam 34 existing between the plate 28 and a lower plate 35. In the particular embodiment of the invention chosen for illustration, the welding apparatus is known as the "Unionmelt" apparatus and the motor means is provided with means regulating the rate of feed of the electrode in response to variations in voltage across the welding zone. Means (not shown) are also provided for establishing the proper distribution of electrical energy to create an arc for accomplishing welding. Means in the form of manually operable handles 36 and 37 are provided for moving the welding head 33 inwardly, outwardly and vertically to locate the welding head the correct distance and in correct alignment with the seam 34. A spring 38 is connected to the frame and to the welding apparatus to urge the latter against the plate 35.

The lower portion of the frame 29 is provided with a pair of wheels 39 in rolling contact with the plate 35. Clutch means operated by the handle 40 are provided to clutch the driving motor 26 to the wheel 24 to propel the carriage, and hence the apparatus, along the seam. The driving motor 26 may be adjusted to give a speed along the weld of from 10 to 60 inches per minute.

As previously indicated, the particular welding apparatus shown uses the so-called submerged arc method of welding in which the arc existing between the end of the electrode and the seam to be welded is completely covered by a pile of granular flux material. The flux used in the method shown is a granulated, chemically stable, fusible material substantially free from substances evolving large amounts of gas during welding. The unfused portions of this particular type of granular flux may be used repeatedly without ill effect. I provide a hopper 42 adapted to carry a supply of the flux material and deliver it by means of a pipe 43 to a support 44 for the flux immediately ahead of the arc. It is the function of the flux 47 to make possible the use of very high currents, to concentrate the generated heat, to cleanse the molten metal and hold it in place, and to shield the hot weld metal from the atmosphere. For this reason, the flux support has sufficient width and length to permit the establishment of a dam of flux and to retain the flux in position until the weld is quenched. A suction pipe 45 has its lower end closely adjacent the support behind the arc to pick up unfused flux material from the support through the medium of a pump 46 and return it to the hopper.

The simplest form of the support (shown in Fig. 9) is an angle iron 48 which is welded by tack welds 49 to the lower plate 35 immediately below the seam 34. Obviously, other means may be provided to hold the support in position. Flux is supplied through the pipe 43 to the support just ahead of the arc and the suction line 45 removes the unfused flux from the support after it has served its purpose.

Another form of flux support is shown in Fig. 10 in which I provide a shoe 50 carried by the frame 29 and urged by means of a spring 51 outwardly against the plate 35 just below the seam. The shoe has a length along the seam sufficient to permit setting of the molten metal before the flux is removed therefrom by the suction pipe.

In Figs. 1 to 4, inclusive, I show a flux support comprising a caterpillar type tread 53 comprising an endless carrier 54 carrying a plurality of blocks 55. The carrier is mounted upon rollers 56 rotatably mounted about substantially vertical axes and carried at the upper ends of posts 57 mounted on the framework 29. The blocks may be of steel, fiber, wood, asbestos, or the like. This particular embodiment of the invention is advantageous in that the flux does not move, that is, it is not dragged along the weld, as is the case in the embodiment of Fig. 10. The flux pours out of the pipe 43 onto the blocks 55 just ahead of the welding head 33 and remains in position against the seam until the carriage is moved a distance equal to the distance between the pipe 43 and the suction line 45, whereupon the unfused flux is removed and returned to the hopper.

A somewhat similar embodiment is shown in Figs. 7 and 8 in which a pair of rollers 60 are rotatably mounted on the posts 57 about axes that are tilted somewhat from the horizontal, as shown in Fig. 8. An endless belt 61 is carried by the rollers and is driven by contact between the inner beveled and scored edge 62 of each roller and the lower plate 35. A support, in the form of a flat plate 63, is carried by a bar 64 which extends between the post 57 adjacent their upper ends and supports the central portion of the belt against sagging under the weight of the flux.

When the opposite sides of the seams are both welded, but not simultaneously, the result may be as shown in Fig. 6 wherein the fold 70 on one side and the weld 71 on the opposite side both extend toward, but do not reach, the center of the seam. If two welds do not meet, a small unfused area 72 is left in the joint. This is acceptable for low-stressed horizontal joints of oil storage tanks, according to the American Petroleum Institute standards which provide that such joints may have partial penetration, provided the unwelded portion is centrally located and does not exceed one-third of the thickness of the thinner plate welded. I have discovered, however, that the same expenditure of energy used in producing a partial-penetration joint, as shown in Fig. 6, will produce a full-penetration joint, such as illustrated in Fig. 5, provided the two sides are welded simultaneously. The upper and lower plates shown in Fig. 5 have the same thickness as the plates of Fig. 6 and the outer weld 70a extends to the inner weld 71a so that there is complete fusion at the joint. It is believed that welding both sides simultaneously provides a very high heat input which induces deep penetration, and the electric arc method illustrated produces a magnetic field to hold the molten metal in the seam. I find that I can constantly produce welds of the type shown in Fig. 5 wherein the area of fusion extends completely through the seam even with plate thicknesses up to one inch or more. If it is desired to weld both sides simultaneously, but without complete fusion through the seam, the welding head on one side may be advanced six or eight inches ahead of the welding head on the other side.

The plates to be welded should be squared to an accuracy of 1/16 inch in the shop. This is customary procedure.

The operation of my apparatus in the field is exceedingly simple, it being only necessary to secure the plates together in edge-to-edge relationship by means of temporary keying apparatus or the sort, place the carriage on the upper edge of the plate, make the initial adjustment at the wheels to position the welding head 33, and then start the arc, the flow of flux, and the movement of the carriage by operation of appropriate controls. The welding will be continuous either on one or both sides of the seam, as desired, until the entire length of the seam has been completed. While it may be unnecessary to adjust the welding apparatus during its travel along the seam, I find it advisable to provide a pointing device just ahead of the welding head and aligned therewith, inasmuch as the welding head itself is hidden beneath the flux during the welding. A man may watch the travel of the pointer along the weld and make whatever minor adjustments are necessary to maintain proper alignment as the carriage moves from plate to plate.

I claim:

1. Welding tool manipulating apparatus for submerged arc welding of substantially horizontal edges of substantially vertical, stationary shell plates, comprising, a chassis having rolling means mounted thereon to carry the apparatus around the shell of a tank in a direction parallel to the upper edge of the plates at a predetermined rate independent of plate surface irregularities, said chassis including a depending portion, a welding unit mounted on said depending portion, means for moving the welding unit relative to the chassis to position a welding wire at the edges to be welded together, flux support means carried by the depending portion and being held against the plate immediately below said edges, means for feeding flux to the support and welding wire to the edges of said plates, and motor means for driving the apparatus along the plates.

2. Welding tool manipulating apparatus for submerged arc welding of substantially horizontal edges of substantially vertical, stationary shell plates, comprising, a chassis having rolling means mounted thereon and adapted to engage the upper edges of said plates to carry the apparatus around the shell of a tank in a direction parallel to the edges to be welded, variable speed motor means for driving the apparatus along the plates at a selected uniform rate, said chassis including a depending portion, a welding unit mounted on said depending portion, means for moving the welding unit relative to the chassis to position a welding wire at the edges to be welded together, flux support means dependently carried by the chassis and being held against the plate immediately below said edges, means for feeding flux to the support, and means for feeding welding wire to the edges of said plates.

3. Appaartus as set forth in claim 2 in which the flux support comprises an endless belt having an upper and lower run, the upper run of which supports the flux and there being means for driving the upper run in a direction opposite to the forward movement of the carriage and at the same speed whereby the upper run of the belt remains substantially stationary with respect to said plate during movement of the apparatus along the plates.

4. Apparatus as set forth in claim 3 in which the belt is mounted on tipped rollers at least one of which rollers is in engagement with the plate whereby the roller and the belt are driven by motion of the carriage along the plate.

5. Apparatus as set forth in claim 3 in which the central portion of the upper run of the belt is supported by a plate.

6. Welding tool manipulating apparatus for submerged arc welding of substantially horizontal edges of substantially vertical, curved stationary shell plates, comprising, a chassis having rolling means mounted thereon to carry the apparatus along the plates in a direction parallel to the edges to be welded, said chassis including a depending portion, a welding unit mounted on said depending portion, means for moving the welding unit relative to the chassis to position a welding wire at the edges to be welded together, flux support means dependently carried by the chassis and being held against the plate immediately below said edges, means for moving the flux support in a direction opposite to the forward movement of the carriage and at the same speed, whereby said flux support remains stationary with respect to said plate during movement of the apparatus along the plates, means for feeding flux to the support, means for feeding welding wire to the edges of said plates, and motor means for driving the apparatus around the shell of said tank.

7. Welding tool manipulating apparatus for submerged arc welding of substantially horizontal edges of substantially vertical, stationary shell plates, comprising, a chassis having rolling means mounted thereon to carry the apparatus around the shell of a tank in a direction parallel to the edges to be welded, said chassis including a pair of depending portions, one of said pair being on each side of the plate, a welding unit mounted on each of said depending portions, means for moving the welding units relative to the chassis to position a welding wire at the edges to be welded together and respectively on opposite sides of the plate, flux support means on each side dependently carried by the chassis and being held against the plates immediately below the edges on their respective sides of the plate, means for feeding flux to each support, means for feeding welding wire to the edges of said plates on both sides thereof and motor means for driving the apparatus around the shell of said tank.

8. Welding tool manipulating apparatus for submerged arc welding of substantially horizontal edges of substantially vertical, stationary shell plates, comprising a chassis having rolling means mounted thereon to carry the apparatus around the shell of a tank in a direction parallel to the edges to be welded, said chassis including a pair of depending portions, one of said pair being on each side of the plate, a welding unit mounted on each of said depending portions, means for moving the welding units relative to the chassis to position a welding wire at the edges to be welded together and respectively on opposite sides of the plate, flux support means carried by said depending portions and being held against the plates immediately below the edges on their respective sides of the plate, means for moving the flux supports in a direction opposite to the forward movement of the carriage and at the same speed, whereby said flux supports remain stationary with respect to said plate during movement of the apparatus around the shell of the tank, means for feeding flux to each support, means for feeding welding wire to the edges of said plates on both sides thereof and motor means for driving the apparatus around the shell of said tank.

9. A welding apparatus adapted continuously to weld by submerged arc welding a substantially horizontal seam between substantially vertically positioned plates, comprising a carriage having wheels adapted to roll upon the exposed edge of one of the plates, motor means for driving the carriage along the exposed edge of the plates at a predetermined rate, said carriage being provided with a framework depending from the wheels on one side of the plates being welded, a welding head carried by the depending framework adjacent the seam to be welded, mechanically adjustable means for moving the welding head relatively to the seam, a continuous flux supporting means below the seam, movable with said carriage and having a portion extending along, preceding and following the welding head and remaining stationary with respect to the plates being welded during movement of said carriage, and flux supply means for directing flux to said stationary portion of said flux supporting means.

10. Welding tool manipulating apparatus for submerged arc welding of substantially horizontal edges of substantially vertical, curved stationary shell plates, comprising a chassis having rolling means mounted thereon to carry apparatus along the plates in a direction parallel to the edges to be welded, said chassis including a depending portion, a welding unit mounted on said depending portion, including a welding rod which rod is biased toward the plate and yieldably mounted with respect to the depending portion, means for moving the welding unit relative to the chassis to position a welding wire at the edges to be welded together, flux support means dependently carried by the chassis and being held against the plate immediately below said edges, means for moving the flux support in a direction opposite to the forward movement of the carriage and at the same speed, whereby said flux support remains stationary with respect to said plate during movement of the apparatus along the plates, means for feeding flux to the support, means for feeding welding wire to the edges of said plate, and motor means for driving the apparatus around the shell of said tank.

References Cited in the file of this patent

UNITED STATES PATENTS

| Number | Name | Date |
|---|---|---|
| 1,539,383 | Bienenstok | May 26, 1925 |
| 1,580,020 | Cutler et al. | Apr. 6, 1926 |
| 1,806,954 | Schmitz | May 26, 1931 |
| 1,978,042 | Dodge | Oct. 23, 1934 |
| 2,153,785 | Williams | Apr. 11, 1939 |
| 2,197,281 | Tripp | Apr. 16, 1940 |
| 2,241,572 | Armstrong | May 13, 1941 |
| 2,294,439 | Bagley | Sept. 1, 1942 |
| 2,364,826 | Smith | Dec. 12, 1944 |
| 2,390,560 | Stanley et al. | Dec. 11, 1945 |
| 2,395,723 | Chmielewski | Feb. 26, 1946 |
| 2,401,722 | Clapp et al. | June 11, 1946 |
| 2,434,481 | Anderson | Jan. 13, 1948 |
| 2,529,812 | Peters | Nov. 14, 1950 |